United States Patent [15] 3,649,185
Sato et al. [45] Mar. 14, 1972

[54] METHOD FOR REMOVING IMPURITIES IN THE BAYER PROCESS

[72] Inventors: Chosei Sato; Akihisa Furukawa; Yoichi Sano, all of, Yokohama, Japan

[73] Assignee: Showa Denko Kabushiki Kaisha, Tokyo, Japan

[22] Filed: Aug. 21, 1968

[21] Appl. No.: 754,176

[30] Foreign Application Priority Data

Aug. 23, 1967 Japan...................................42/53888

[52] U.S. Cl.................................23/143, 209/158, 260/546
[51] Int. Cl. .....................C01f 7/14, C01f 7/02, B01d 21/00
[58] Field of Search............................................23/143, 52

[56] References Cited

UNITED STATES PATENTS 2,935,376 5/1960 Roberts ...................................23/143
3,372,985 3/1968 Roberts et al............................23/143

Primary Examiner—M. Weissman
Attorney—George B. Oujevolk

[57] ABSTRACT

Improvement in the Bayer process wherein a first cycle, alumina hydrate is precipitated from an alumina pregnant caustic liquor which liquor also contains an oxalate impurity. The precipitation of the alumina hydrate is favored and the precipitation of the oxalate in the liquor is inhibited by selectively controlling the temperature of the liquor as a function of the concentration of the oxalate contaminating impurity in the liquor.

4 Claims, 4 Drawing Figures

INVENTORS
Chosei Sato
Akihisa Furukawa
Yoichi Sano

BY George B. Oujevolk

ATTORNEY

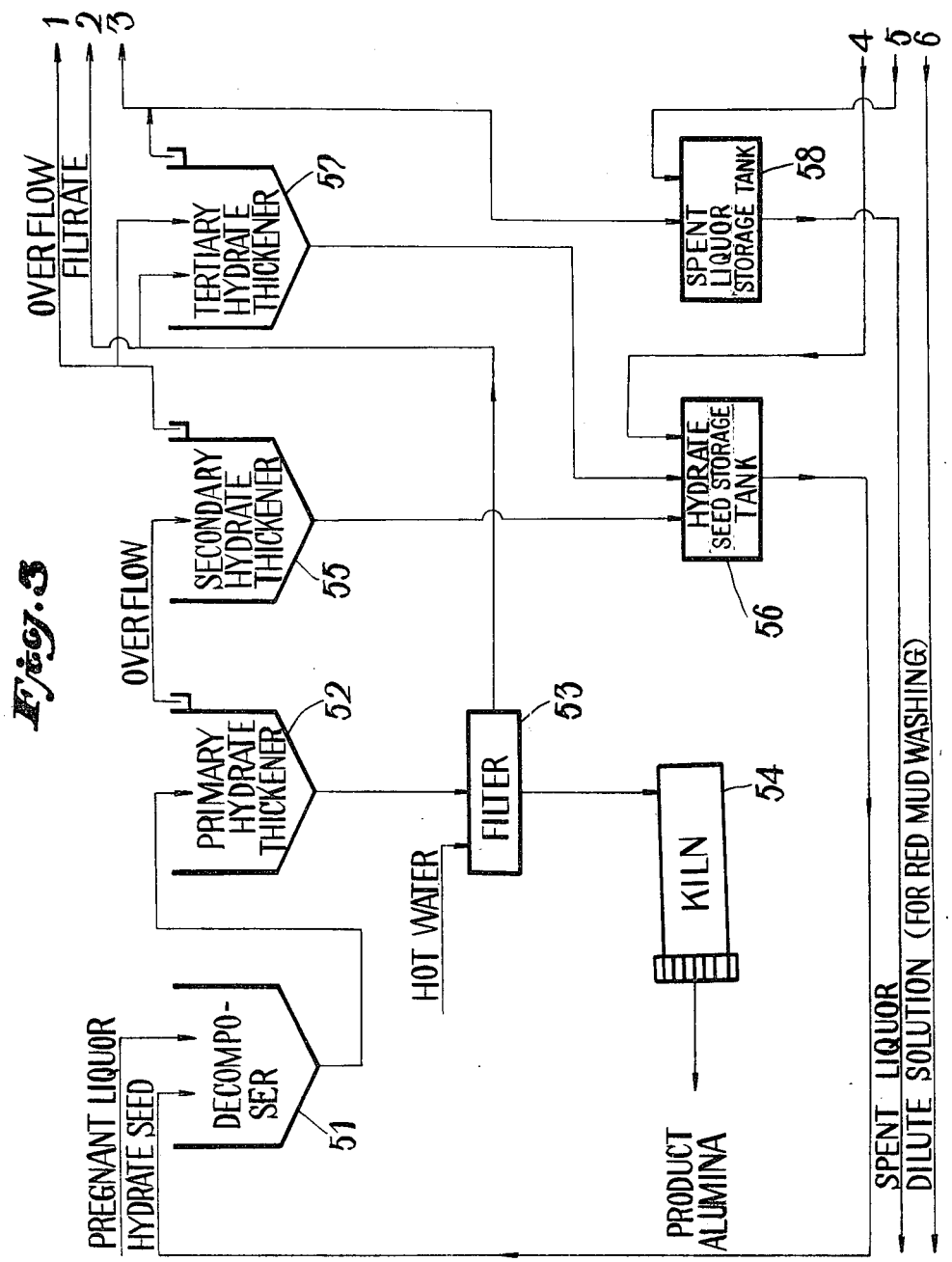

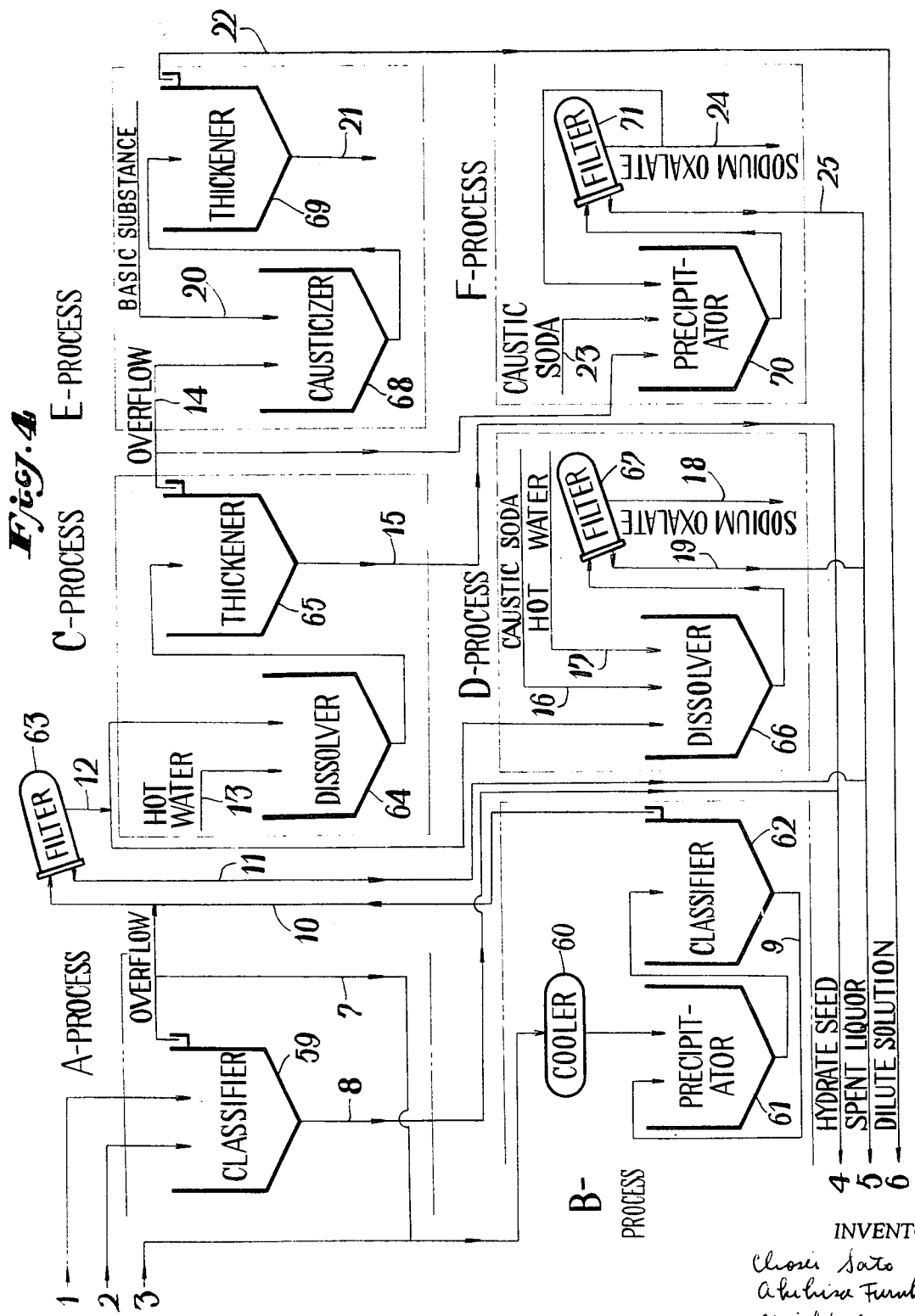

METHOD FOR REMOVING IMPURITIES IN THE BAYER PROCESS

This invention relates to a method for removing impurities composed mainly of sodium oxalate or oxalate salt (organic materials in the liquor as determined by a potentiometric titration with perchlorato-cerate in perchloric acid solution) in Bayer process and further to recover caustic soda or sodium oxalate by giving suitable treatment to the removed impurities.

In the Bayer process, the bauxite slurry which contains various impurities existing in the raw material, especially organic substances contained in the ore and such organic substances as organic substance sedimentation promoters used in the red mud sedimentating process, is treated at a high temperature and high alkalinity in order to extract alumina.

In the process of treatment, part of the organic substances contained in the slurry as impurities are dissolved and converted into substances of lower molecular weights such as oxalic, acetic, glycolic, carbonic or other sodium salts.

Among the above sodium salts, sodium oxalate crystallizes in the alumina manufacturing process and deposits as scale on the inner walls of vessels and piping, disturbing smooth operation and causing various troubles. Besides, if crystals of sodium oxalate exist in the slurry in the hydrate decomposer, they will promote the generation of new crystal nuclei of alumina hydrate at the time of its decomposition and lower its agglomeration activity, reducing, as a result, the grain size of alumina hydrate.

As a method to remove the above impurities, according to the U.S. Pat. No. 3,372,985, all the alumina hydrate seed is filtered and washed in two stages. In the second stage of washing, sodium oxalate is dissolved in the washing liquor and removed, and then caustic soda is recovered by treating the washing liquor. But, as this method filters and washes great quantities of solids, it requires equipment of large scale and a vast volume of washing liquor.

A method is also known in which impurities are separated and removed by evaporating and condensing the circulating spent liquor (clear overflow from the hydrate thickener in the final stage) and caustic soda and alumina are recovered by roasting the separated impurities. This method, however, requires not only evaporating and roasting equipment of a large scale, but also a large amount of heat.

The main object of this invention is to provide a method which, in the Bayer process, easily removes impurities, especially sodium oxalate from the spent liquor and recovers caustic soda or sodium oxalate by treating the removed impurities.

As a result of various investigations and researches, the inventors have found a method to remove, in the Bayer process, impurities comprising mainly sodium oxalate and recover caustic soda or sodium oxalate by treating the removed impurities by means of utilizing the fact that i. the solubility of sodium oxalate in a caustic soda solution containing sodium aluminate varies in a wide range depending on the concentration of caustic soda and the temperature of the solution, ii. sodium oxalate which is crystallized from a liquid supersaturated with sodium oxalate is, when existing together with a large quantity of alumina hydrate crystals, contained mainly in the finer part of the crystals, iii. sodium oxalate dissolved in a solution of a suitable alkaline concentration reacts with slaked lime to form calcium oxalate.

In the following detailed explanation of this invention, in the accompanying drawings:

FIGS. 3 and 4 are schematic views showing the methods of this invention.

Figure 1:
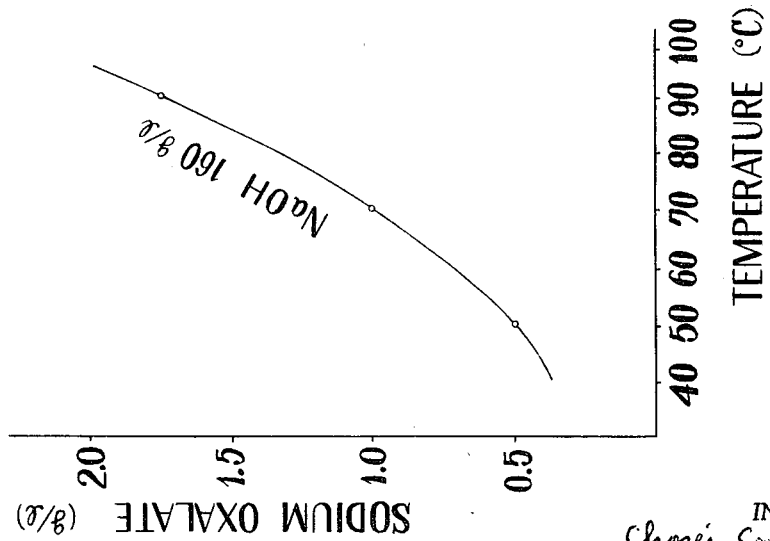
FIG. 1 is a graph showing the solubility of sodium oxalate in a sodium aluminate solution of high alkaline concentration.

Referring to FIG. 1, the concentration of sodium oxalate is shown on the ordinate axis and temperature of solution on the abscissa axis.

Ordinarlily, in the Bayer process, the alumina contained in bauxite is extracted by a circulating liquor containing caustic soda at the concentration of 160 g./l. and then said circulating liquid is cooled down to about 100°C. and separated from solution residues to produce a clear liquor. Further, the liquor is cooled to the temperatures of 60° to 70°C. to separate alumina hydrate and the liquor after removal of alumina hydrate is used again as the circulating liquor. Meanwhile, the liquor lowers in temperature to about 50°C. by natural cooling.

Now, if sodium oxalate exists in the circulating liquor at the concentration of 1 g./l., as shown in FIG. 1, saturation is attained at 70°C. and, with further lowering of temperature, the state develops into supersaturation and sodium oxalate begins to crystallize from the liquor. As the crystallized sodium oxalate is contained mainly in the finer part of the crystals, the sodium oxalate may easily be separated.

Figure 2:
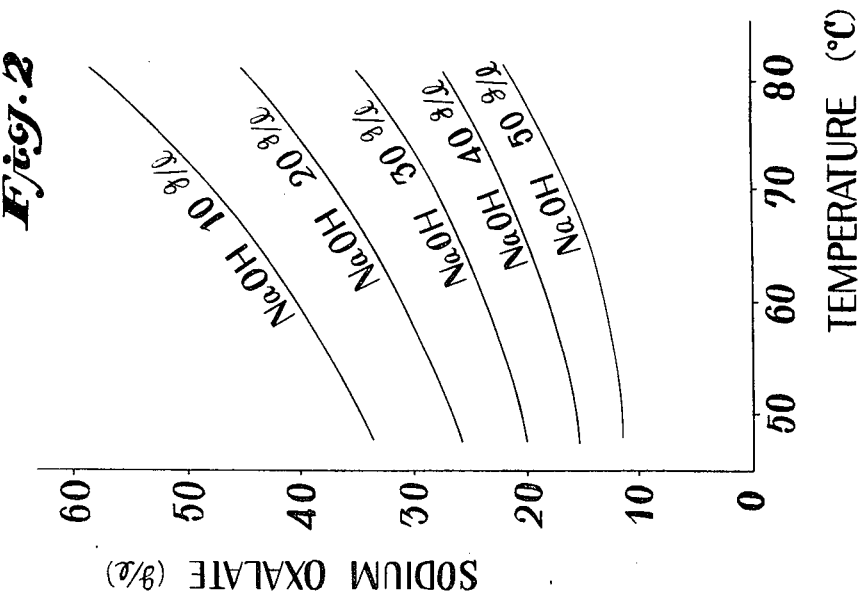
FIG. 2 is a graph showing the solubility of sodium oxalate in a sodium aluminate solution of low alkaline concentration.

In FIG. 2 are shown the relationship of a low concentration caustic soda solution and its temperature to the solubility of sodium oxalate in which the concentration of sodium oxalate is plotted on the ordinate axis and the temperature of the solution plotted on the abscissa axis.

It can be seen from FIG. 2 that if solids containing sodium oxalate are dissolved in hot water, sodium oxalate will dissolve as the concentration of caustic soda decreases, but if caustic soda is added to said solution, the concentration of caustic soda will increase and sodium oxalate can be easily precipitated.

Referring to FIGS. 3 and 4, slurry from hydrate decomposer 51 is sent to primary hydrate thickener 52. In thickener 52, an underflow with a concentration of 500 to 700 grams of solid per liter is separated from the slurry. The underflow is then filtered by filter 53 and calcined by kiln 54 to obtain the product alumina.

Filtrate from filter 53 is mostly sent to tertiary hydrate thickener 57, but part of it is transferred through line 2 to classifier 59.

Overflow from primary thickener 52 is carried to secondary hydrate thickener 55 and overflow from the latter thickener 55 is sent to tertiary thickener 57 except for part of the overflow which is transferred to classifier 59 through line 1.

In classifier 59, the up-current velocity is adjusted so that the solution can be separated into an overflow with a concentration of 2 to 5 grams of solid per liter and an underflow with a concentration of 400 to 700 grams of solid per liter. The underflow from classifier 59 is collected in hydrate seed storage tank 56 through lines 8 and 4 together with underflows from secondary thickener 55 and tertiary thickener 57 and used as a hydrate seed liquor.

As stated previously, when the concentration of sodium oxalate is in a state of superstaturation, the crystals of sodium oxalate become very fine. Therefore, the solids in the overflow from classifier 59 contain sodium oxalate in percentages ranging from 10 to 30 weight percent.

This process is shown in FIG. 4 as "A-process".

As is clear from FIG. 1, if the overflow from classifier 59 is cooled, it will become a solution supersaturated with sodium oxalate. If hot water of 50° to 70°C. is used as washing water in filter 53, almost all the sodium oxalate attaching to the alumina hydrate will be dissolved. Further, if the filtrate from filter 53 is added to this washing water, the concentration of caustic soda will be increased by the filtrate and the solution will be supersaturated with sodium oxalate. Besides, if a part of the overflow from tertiary thickener 57 is separated and cooled, similarly it will become a solution supersaturated with sodium oxalate.

Accordingly, if these solutions are cooled individually or collectively in cooler 60 to temperatures of 20° to 50°C., transferred to precipitator 61, given an underflow containing crystals of sodium oxalate as seeds through line 9 from classifier 62 and agitated for 2 to 3 hours, the sodium oxalate in the solutions will continue to precipitate until the solution attains saturation.

If these solutions containing crystalized sodium oxalate are sent to classifier 62 and said classifier is operated adjusting the up-current velocity to 2 to 5 m./h., the solids in the overflow 10 from said classifier 62 contain sodium oxalate at a concentration of 15 to 35 weight percent.

This method is capable of obtaining crystals which contain more sodium oxalate while treating a smaller quantity of solution compared with the case where the "A-process" is applied individually.

This process is shown in FIG. 4 as "B-process".

Next, filter 63 is used to separate solids from the overflow containing solids which include large quantities of sodium oxalate from classifiers 59 and 62. For this filter, any type of filter such as a pressure filter, vacuum filter or centrifugal separator may be used.

The solids (including 10 to 40 percent of moisture) separated by filter 63 are sent through line 12 to dissolver 64 which is filled with hot water supplied from line 13, and dispersed and agitated therein. Sodium oxalate and other water-soluble impurities will dissolve. Next, the solution is transferred to thickener 65 and wherein alumina hydrate will settle.

The quantity of hot water that is supplied by line 13 in order to completely dissolve the sodium oxalate in dissolver 64 differs with the quantity of caustic soda attached to the solids separated by filter 63 and with the temperature of the hot water. This relationship is shown in FIG. 2. Any amount of hot water satisfying the conditions of this figure for total solution of the sodium oxalate will be sufficient.

For the hot water used here, it is possible to utilize the recovered steam condensed water generated in the dissolving process of bauxite.

The solids collected in thickener 65 were originally floating in the overflow from classifiers 59 and 62. However, as water-soluble impurities composed mainly of sodium oxalate have been removed, the concentration of the dispersion medium liquid is low and both the viscosity and specific gravity are smaller than the mother liquor of the Bayer process and therefore the settling property is considerably increased and settling and separation can be performed in a thickener of a small size. Alumina hydrate is made into an underflow with a concentration of 800 to 1000 grams of solid per liter, sent to hydrate seed storage tank 56 through lines 15 and 4 and used as the hydrate seed liquor.

As the alumina hydrate in line 15 has been classified by three settling and separating operations, it is composed of very fine particles 80 percent of which are below 20 microns and can be used for various special purposes besides manufacturing aluminum by the electrolytic process.

This process is shown in FIG. 4 as "C-process".

When the solids (including 10 to 40 percent of moisture) filtered and separated by filter 63 are sent to dissolver 66 which is filled with caustic soda solution supplied from line 16 and dispersed and agitated therein, the alumina hydrate in the solids will dissolve but the sodium oxalate will remain as solids without dissolving owing to the high concentration of caustic soda in the solution.

As the caustic soda solution fed from line 16 has a high concentration, it must be adjusted to a suitable concentration by supplying hot water from line 16.

The solids floating in the solution of dissolver 66 are impurities composed mainly of sodium oxalate and are filtered and separated by filter 67.

The filtrate filtered by filter 67 is carried to spent liquor storage tank 58 through lines 19 and 5 used to supplement caustic soda to the Bayer process so that the alumina hydrate dissolved in the solution can be recovered.

As the filter cake obtained through line 18 is mainly composed of sodium oxalate, it may be used as material for manufacturing oxalic acid or roasted to recover caustic soda.

This process is shown in FIG. 4 as "D-process".

In the overflow from thickener 65 of the "C-process" are contained caustic soda at a concentration of 15 to 20 g./l., sodium oxalate at a concentration of 25 to 30 g./l., alumina at a concentration of 7 g./l. and sodium carbonate at a concentration of 10 g./l.

When this overflow is transferred to causticizer 68 through line 14 and agitated therein for reaction by adding slaked lime from line 20, most of the sodium oxalate will react and turn into calcium oxalate and caustic soda. At this time, part of the sodium carbonate in the solution will also react to change into solids of calcium carbonate and caustic soda. Besides, part of the alumina in the solution will react and precipitate as calcium aluminate, but the quantity is not large.

In this case, in the place of slaked lime, any basic substance which forms insoluble salts by reacting with sodium oxalate such as barium hydroxide or the like can be used.

The reaction temperature, reaction time and the amount of slaked lime to be added to causticizer 68 must be determined by selecting the most advantageous conditions from the fact that the reactions to be formed at this time are the equilibrium reactions of sodium oxalate, sodium carbonate and sodium aluminate with calcium hydroxide and the individual reactions are dissociation equilibrium reactions as shown by the following chemical formulas.

$$Na_2C_2O_4 + Ca(OH)_2 \rightleftharpoons 2NaOH + CaC_2O_4$$
$$Na_2CO_3 + Ca(OH)_2 \rightleftharpoons 2NaOH + CaCO_3$$
$$2NaAlO_2 + Ca(OH)_2 \rightleftharpoons 2NaOH + Ca(AlO_2)_2$$

In this invention, treatments were give under the following conditions.

Temperature: 50° to 60°C.
Addition of calcium hydrate: 200 to 250 weight percent of the dissolved sodium oxalate
Reaction time: 1 to 2 hours When treatment is conducted under these conditions, 60 to 80 weight percent of the sodium oxalate in the solution is subject to reaction and turns into calcium oxalate.

The solution which has undergone the above treatment is a slurry mainly composed of caustic soda and containing solids of calcium oxalate and unreacted slaked lime. This solution is sent to thickener 69 to be separated into liquor and solids. The slurry flowing out of line 21 is an underflow of a concentration of 600 to 1000 grams of solid per liter and may be discarded or used as raw material for manufacturing oxalic acid.

The solution 6 which has been freed of solids contains caustic soda at a concentration of 20 to 40 g./l. Therefore, it is mainly used as washing water for washing red mud in the Bayer process.

This process is shown in FIG. 4 as "E-process".

A part of the overflow from thickener 65 of the "C-process" is sent to precipitator 70 and caustic soda is added to it from line 23. If the concentration of the caustic soda in the solution of the precipitator is increased, the solubility of sodium oxalate will decrease and sodium oxalate will precipitate from the solution. Thus, the solution containing crystals of sodium oxalate is transmitted to filter 71 and separated into solids and solution.

The solids obtained from line 24 can be used as raw material for manufacturing oxalic acid or roasted to recover caustic soda. The solution freed of solids is sent to spent liquor storage tank 58 through lines 25 and 5 and is used to supplement caustic soda to the Bayer process.

This process is shown in FIG. 4 as "F-process".

According to this invention, if all or some of the above "A through F processes" are combined with the Bayer process, it is possible to remove impurities which are mainly composed of sodium oxalate which is a harmful component in the process, and in addition easily recover useful components in the impurities.

As the sodium oxalate contained in the solution circulating in the process decreases thus preventing the accumulation of sodium oxalate in the seeds, the reactions at the time of the precipitation of alumina hydrate will be accelerated, scale sticking to the equipment will decrease and the grains of precipitated alumina hydrate will be larger.

The following Examples are further illustrative of this invention, and it will be understood that the invention is not limited thereto.

When the operation was conducted combining the "A-process" - "filter 63" - "C-process" - "E-process" illustrated in FIG. 4, the results shown below were obtained.

The classifier 59 in Table 1 was adjusted so that the up-current velocity was 0.4 m./hr.

TABLE 1.—APPLICATION EXAMPLE OF "A-PROCESS"

| Description | Symbol in Fig. 4 | Flow rate, m.³/h. | Flow rate of solids, kg./h. | Sodium oxalate in solids Content, wt. percent | Flow rate, kg./h. |
|---|---|---|---|---|---|
| Liquid fed to classifier 59 | 1+2 | 120 | 4,800 | 2.9 | 138 |
| Overflow from above classifier | 7 | 106 | 370 | 18.0 | 67 |

The overflow in Table 1 was further filtered at pressures of 3 to 5 kg./cm.² and the filtered wet cake was dispersed in hot water of 90°C. to dissolve sodium oxalate in it. The sodium oxalate was then settled and separated, the result being as shown in FIG. 2.

TABLE 2.—APPLICATION EXAMPLE OF "C-PROCESS"

| Description | Symbol in Fig. 4 | Flow rate | Sodium oxalate contained in solids or solution Content | Flow rate |
|---|---|---|---|---|
| Filtered cake | 12 | 530 kg./h. (wet). | 18.0 wt. percent (dry). | 67 kg./h. |
| Overflow from thickener 65. | 14 | 1.9 m.³/h. | 30 g./l. | 57 kg./h. |

Further, calcium hydrate was added to the overflow in Table 2 and left to react at 60°C. for 2 hours. After this, settlement and separation were performed and such results as shown in Table 3 were obtained.

TABLE 3.—APPLICATION EXAMPLE OF "E-PROCESS"

| Description | Symbol in Fig. 4 | Flow rate | Sodium oxalate contained in solids or solution Content, g./l. | Flow rate, kg./h. | Concentration of caustic soda in solution, g./l. |
|---|---|---|---|---|---|
| Slaked lime added. | 20 | 65 kg./h. | | | |
| Underflow from thickener 69. | 21 | 0.15 m.³/h. | | ¹ 45.5 | |
| Overflow from above thickener. | 22 | 1.7 m.³/h. | 6 | 11.5 | 23 |

¹ In this figure is contained the substance which turned into calcium oxalate after being calculated in terms of sodium oxalate.

In the above example, it was possible to remove sodium oxalate continuously at the rate of 45.5 kg./hr.

Table 4 shows an application example in which the "B-process" illustrated in FIG. 4 was continuously operated at the temperature of 50°C. and at the average reaction time of 3 hours.

When the overflow of Table 4 was further given the treatment of "filter 63" - "C-process" - "E-process", it was possible to finally remove sodium oxalate at the rate of 69.5 kg./hr.

TABLE 4.—APPLICATION EXAMPLE OF "B-PROCESS"

| Description | Symbol in Fig. 4 | Flow rate, m.³/h. | Sodium oxalate dissolved in solution, g./l. | Sodium oxalate in solids Content, wt. percent | Flow rate, kg./h. |
|---|---|---|---|---|---|
| Liquid fed to sodium oxalate precipitator 61 | (*) | 38 | 3.0 | 1.6 | 3 |
| Overflow from sodium oxalate classifier 62 | 10 | 38 | 0.6 | 30.4 | 91 |

*3 and/or 7.

Further, the overflow of the "A-process" shown in Table 1 was filtered, the wet cake produced was fed with hot water and caustic soda according to the "D-process" in FIG. 4 and agitated to dissolve alumina hydrate while keeping the mixture at the temperature of 70°C. The solution was then filtered at the pressure of 2 to 5 kg./cm.² with the results such as shown in Table 5.

TABLE 5.—APPLICATION EXAMPLE OF "D-PROCESS"

| Description | Symbol in Fig. 4 | Flow rate | Sodium oxalate contained in solids or solution Content | Flow rate | Concentration of caustic soda | Concentration of alumina |
|---|---|---|---|---|---|---|
| Wet filtered cake of filter 63 | 12 | 530 kg./h. | 18 wt. percent (dry). | 67 kg./h. | | |
| Hot water | 17 | 3.1 m.³/h | | | | |
| Pure caustic soda solution | 16 | 1.4 m.³/h | | | 650 g./l. | |
| Wet filtered cake of filter 67 | 18 | 100 kg./h. | 90 wt. percent (dry). | 63 kg./h. | 4 kg./h. | 3 kg./h. |
| Filtrate of above | 19 | 4.6 m.³/h. | 0.9 g./l. | 4 kg./h. | 200 g./l. | 80 g./l. |

TABLE 6.—APPLICATION EXAMPLE OF "F-PROCESS"

| Description | Symbol in Fig. 4 | Flow rate | Sodium oxalate (solid or liquid) Content, g./l. | Flow rate, kg./h. | Concentration of caustic soda |
|---|---|---|---|---|---|
| Overflow from thickener 65 | 14 | 1.9 m.³/h. | 30 | 57 | 8.9 g./l. |
| Caustic soda solution to be added | 23 | 0.8 m.³/h. | | | 650 g./l. |
| Wet filtered cake of filter 71 (excluding part to be returned as seed) | 24 | 78 kg./h. | | 54 | 4 kg./h. |
| Filtrate from above | 25 | 2.7 m.³/h. | 1 | 3 | 200 g./l. |

According to the above result, sodium oxalate can be removed at the rate of 63 kg./hr.

Further, the clear overflow of the "C-process" shown in Table 2 was taken, given caustic soda and agitated at 50°C. after adding seeds of sodium oxalate to it to precipitate the sodium oxalate which remained dissolved in the solution. Then, the liquid was filtered at pressure of 2 to 5 kg./cm.² with the result such as shown in Table 6. According to this method, sodium oxalate can be removed at the rate of 54 kg./hr.

Table 7 shows examples of alumina hydrate precipitated respectively by the conventional method and the method of this invention.

TABLE 7.—GRAIN SIZES OF PRECIPITATED ALUMINA HYDRATE

| Grain size | Weight percentage Conventional Bayer process | Bayer process according to this invention |
|---|---|---|
| Below 20 microns | 10 | 3 |
| 20-40 microns | 30 | 15 |
| Over 40 microns | 60 | 82 |

What is claimed is:

1. In the Bayer process wherein alumina-containing raw material is digested in a caustic soda solution thus forming a caustic soda solution pregnant with alumina hydrate which also contains sodium oxalate and from which is separated large particles of alumina hydrate which are subjected to filtration to produce a filtrate and a filter cake of solid particles of aluminum hydrate which are washed and calcined to produce product alumina and the liquor containing fine particles of alumina hydrate from which the large particles of alumina hydrate have been separated is further divided in a first stage by sedimentation and separation into an underflow pregnant with alumina hydrate and an overflow pregnant with sodium oxalate which underflow pregnant with alumina hydrate is recycled as a seed, and which last named overflow is combined with at least a portion of said filtrate to produce a liquid which when subjected to sedimentation and separation in a second stage yields an underflow which is combined with the previously obtained underflow and an overflow containing sodium oxalate, the improvement therein for removing sodium oxalate from said overflows comprising:

subjecting at least a part of the overflow pregnant with sodium oxalate from said first stage wherein said overflow still contains a relatively large amount of alumina hydrate and another portion of the filtrate obtained by the above mentioned filtration to controlled up-current velocities in a classifier to produce an underflow with 400 to 700 grams of solid per liter and an overflow with a concentration of 2 to 5 grams of solid per liter, thereby increasing the amount of sodium oxalate contained among the solids in the overflow from said classifier;

thereafter separating solid particles of sodium oxalate from said last named overflow, cooling the overflow from said second stage to 20° – 50°C. and thereafter separating sodium oxalate therefrom.

2. The process of claim 1 including, in addition, separating said overflow from said classifier into filtrate and filtered cake, treating said filtered cake with caustic soda solution thus converting said cake into sodium aluminate solution and sodium oxalate solids and recovering said sodium oxalate solids.

3. The process of claim 1 including in addition:
  separating said overflow from said classifier into filtrate and filtered cake;
  treating said filtered cake with hot water thus separating said filtered cake into alumina hydrate solids and sodium oxalate solution;
  precipitating sodium oxalate solids in said sodium oxalate solution by adding caustic soda solution thereto; and
  recovering said precipitated sodium oxalate.

4. The process of claim 1 including, in addition:
  separating said overflow from said classifier into filtrate and filtered cake;
  treating said filtered cake with hot water thus separating said cake into alumina hydrate solids and sodium oxalate solution;
  causticizing said sodium oxalate solution by the addition of a basic substance selected from the group consisting of calcium hydroxide and barium hydroxide thereby converting said sodium oxalate solution into caustic soda solution and calcium or barium oxalate solids, the addition being about 200 to 250 weight percent of the dissolved sodium oxalate in said solution; and
  recovering said calcium or barium oxalate solids.

* * * * *